3,275,422
CONTINUOUS-GAS-PHASE VOLATILITY
PROCESS
George I. Cathers, Knoxville, and James C. Mailen, Oak Ridge, Tenn., assignors to the United States of America as represented by the United States Atomic Energy Commission
No Drawing. Filed Aug. 14, 1964, Ser. No. 390,278
11 Claims. (Cl. 23—325)

The present invention relates to methods of processing reactor fuels and more particularly to improved volatility processes.

Fused-salt fluoride volatility processes have been investigated for processing both heterogeneous and homogeneous irradiated reactor fuels. In the case of heterogeneous fuels, as for example zirconium-clad uranium fuel elements, the fuel element is dissolved with anhydrous hydrogen fluoride in a molten fluoride salt mixture, such as equimolar $NaF-ZrF_4$ or $NaF-LiF-ZrF_4$, at an elevated temperature of about 650° C., and the zirconium and uranium are thereby converted to their respective tetrafluorides, both of which are soluble in the fluoride salt. After dissolution the uranium is decontaminated from fission products by further oxidation of the uranium tetrafluoride to the volatile hexafluoride state by contact with elemental fluorine at 500° C. Further decontamination of the uranium hexafluoride product from trace fission products is accomplished by an absorption-desorption cycle on sodium fluoride pellets at 100° C. and 400° C., with the purified uranium hexafluoride being collected in cold traps. For the homogeneous fuels, as for example $LiF-BeF_2-ZrF_4$ salt solvent containing minor portions of $UF_4$, this same process may be employed except the hydrofluorination step.

While the basic fluoride volatility process affords excellent nonaqueous processing of irradiated reactor fuels to recover the therein contained nuclear fuels, it is not without its drawbacks. Probably, the most serious hinderance to an otherwise highly effective process is the corrosion problem. As mentioned above, the fluoride salt mixture is maintained in a molten state within a suitable container while hydrogen fluoride gas is bubbled therethrough to dissolve the zirconium uranium alloy fuel elements. While these salts are not intrinsically corrosive, by the addition of hydrogen fluoride or $F_2$ to the system at elevated temperatures, corrosive attack on the containment vessel becomes quite a problem. This is especially true in batch-type operations. There the alternate contacting of the column walls by the molten salt and the fluorine at the liquid-gas interface caused by bubbling $F_2$ through the melt results in severe corrosion of the column walls. Among the common structural metals, nickel and/or high-nickel alloys, i.e., Inconel, INOR-8, have probably been the most widely investigated and the high-nickel alloys, such as INOR-8, with their well-known oxidation resistance and good mechanical properties at elevated temperatures, appear to be the most promising. However, even these metals undergo extensive corrosion when employed as the container for such molten salt processes. With such difficulties experienced with conventional structural materials, attention has recently been directed toward the refractory metals, such as tungsten, as possible candidates for container materials. However, it is apparent that while such metals possibly experience less corrosive attack they are considerably more expensive than the conventional structural materials. In addition to the corrosive attack during the dissolution process, there are additional corrosion problems during the fluorination step. In the past, one method of overcoming these problems has been to transfer the salt melt containing the soluble uranium tetrafluoride to another vessel to carry out the fluorine sparging. For this nickel has been found to be a suitable structural material. However, certain problems attend manual transfer of the salt melt between successive steps of the process.

One prior art method attempted to alleviate the corrosion problems of such molten salt mixtures by dispersing the molten salt into droplets by passing the salt through a spray nozzle and concurrently contacting the droplets with fluorine gas as they solidified and fell through an unheated tower. While this process afforded some improvements over the basic volatility process, it fell far short of providing an operable process wherein the conversion of the uranium tetrafluoride was accomplished in a single pass and which was amenable to providing a continuous process. Rather, it was found that the percent removal of uranium was so low that a multiplicity of spray towers would be required to avoid an impractically high single-spray tower. Hence, the fluoride salt would have to be recycled through as many as four batch stages to achieve the uranium recoveries attained in the basic volatility process, i.e., better than 99%, in a single batch operation.

It is, therefore, a primary object of the present invention to provide an improved volatility process for treating reactor fuels.

Another object is to provide an improved volatility process wherein both heterogeneous and homogeneous irradiated reactor fuels may be processed.

Still another object is to provide improved continuous gas-phase volatility process for processing both heterogeneous and homogeneous irradiated reactor fuels.

A further object is to provide an improved method for recovering uranium and plutonium values from molten salts containing the same.

Still a further object is to provide an improved fluoride volatility process wherein the corrosive attack on the container vessel is significantly lower than prior art methods.

Another object is to provide a process which is especially adaptable for the efficient recovery of plutonium values from molten fluoride salts.

Other objects and advantages of the present invention will be apparent as the description proceeds.

In accordance with the present invention, there is provided an improved method for the removal of neutron-irradiated nuclear fuels from a fused salt mixture wherein said salt mixture is heated to a molten state, dispersed into salt droplets and contacted with fluorine gas to convert said fuel values to the volatile hexafluoride state and thereby volatilize same, comprising the steps of contacting said salt droplets with gaseous fluorine at a temperature at least as great as the liquidus temperature of said salt mixture to thereby convert said fuel values to the volatile hexafluoride state and thereafter recovering said volatilized hexafluoride product.

With the present process applicants have been able to effect better than 99.9% removal of uranium values from an equimolar $NaF-ZrF_4$ salt mixture containing from 2.5 mole percent to 9 mole percent $UF_4$ in a single 4 ft. long fluorinator column with relatively low corrosion of the nickel fluorinator as compared to prior art processes.

The present process is applicable to any of the salt solvents useful in volatility processes, as for example any of the alkali metal fluorides. Typical examples of such solvents include $NaF-LiF$, $LiF-BeF_2$, $NaF-ZrF_4$, and $NaF-LiF-ZrF_4$. Of these equimolar $NaF-ZrF_4$ or $NaF-LiF-ZrF_4$ salt mixtures have been successfully employed in the dissolution of heterogeneous irradiated reactor fuel elements, such as zirconium-uranium alloy elements, and similarly KF–ZrF$_4$ salt mixtures have recently been devised for the dissolution of aluminum-containing nuclear fuels. On the other hand, Li$^7$F–BeF$_2$–ZrF$_4$ salt mixtures have been proposed as a solvent for a homogeneous reactor fuel.

It is essential to the successful practice of the present invention to maintain the temperature of the fluorinator column at a temperature at least as high as the liquidus temperature of the salt solvent. In one prior art method a study was made as to the effect of increasing the temperature at which the fluorination was achieved up to a point just below the liquidus temperature of the salt on recovery of the fuel values. While it was concluded that as the temperature went up the percent removal of dissolved fuel values increase, it was found that at the same time the height of the column necessary to accomplish such a conversion became inordinately large, so large in fact that for all practical purposes the process was inoperable. Moreover, it was concluded that it would be highly deleterious to such a process to exceed the liquids temperature of the salt due to the severe corrosion problem attendant with rendering the fused salt in a molten state throughout the fluorination operation. Applicants' have unexpectedly found that, contrary to the suggestions in this prior art, as the temperature exeeded the liquids temperature of the salt, the column height required for virtually complete fluorination of the therein contained reactor fuels to the hexavalent state, instead of continuing to rise, dropped off markedly to a very low height, in the range of from 2–4 feet. Furthermore, the corrosion of the contactor at these high temperatures was also unexpectedly low.

While the mechanism by which the successful results are obtained in applicants' process is not completely understood, it is believed ascribable to the maintenance of the salt mixture in a molten state throughout the fluorination operation. This becomes especially convincing when, in contradistinction to the prior art assumption that the conversion of the fuel values to the volatile hexafluoride state involved a surface reaction between the fluorine and the UF$_4$, applicants have found that the conversion does not involve a surface reaction but rather that the fluorine enters the drop before reaction occurs. This is substantiated by the finding that, upon dropping a small amount of salt mixture into the column, gas surges were observed immediately thereafter, indicating that the fluorine had been taken up without a balancing UF$_6$ evolution. It may thus be seen that in such a process wherein the molten salt mixture undergoes solidification almost immediately after it enters the fluorination section, the resulting recovery efficiency will be extremely low due to the formation of an outer crust in the molten drops as the drop progressively is cooled, thereby precluding or greatly retarding the diffusion of the fluorine into the respective drops and conjointly the diffusion of converted UF$_6$ out of the respective drops. In such prior art methods wherein the fluorinator column was maintained at a temperature below the liquidus point of the salt, solidification of the molten drops occured, thus greatly diminishing the recovery efficiency of the process. Moreover, in the case of uranium values and probably other fuel also, this may be compounded by the fact that the mechanism by which UF$_4$ is converted to UF$_6$ by contact with fluorine gas is not a simple reaction of dissolved fluorine reacting with UF$_4$ with subsequent evolution of UF$_6$. Applicants have found that there possibly is an interaction between the oxidation states and the existence of several intermediate oxidation states (between +4 and +6). For this reason the diffusion is not simply of the species UF$_4$ and F$_2$, but involves interaction of the various oxidation state species and carrying of the fluorine by uranium. This last facet is seen to effectively increase the solubility of fluorine, which is normally quite low, in the salt melt. Hence, it may be seen that, where the molten salt droplets are permitted to solidify, forming an initial crust along the outer surface of the respective drops, the increase in fluorine solubility by uranium carrying of the fluorine is greatly diminished due to such initial crust formation and thus significantly decreases the recovery efficiency.

In carrying out the practice of this invention, applicants have found various operating parameters which are preferred. As a preliminary step to the fluorination, the column is purged of any air present. This may be done with any gas which does not react with fluorine, such as helium and, of course, it may be accomplished by flushing the column with fluorine gas itself prior to actual fluorination. In this respect helium may be introduced countercurrently to the fluorine flow and serve as a blanket gas for the fluorinator column. During the fluorine flush the column is brought up to the operating temperature. It will be apparent that the operating temperature of the fluorinator column may vary for the respective salt solvents employed. As previously mentioned it has been found that the fluorinator column must be maintained at a temperature at least as great as the liquidus temperature of the salt and preferrably at a high temperature than the liquidus temperature of the salt. For example, where an equimolar NaF–ZrF$_4$ salt (liquidus temperature 510° C.) containing 2.5 mole percent UF$_4$ is used it is preferred that the fluorinator column be maintained at a temperature within the range of from 570°–650° C., the higher the better. Due to the severity of corrosion of the fluorinator column at elevated temperatures (especially above 700° C.) and other deleterious effects, as for example high vapor pressure of the salt constituents at such elevated temperatures applicants prefer that the temperature to which the fluorinator column is maintained during fluorination not exceed 700° C.

The gas flow rates of the fluorine and the helium (if used) may be varied over a wide range. While large fluorine gas flow rates may be desired for certain purposes (as will hereinafter be explained in greater detail), the requirement of excessively large fluorine traps to recover the volatilzed fuel values, as well as the possibilities of large-scale leaks and high entrainment losses, probably outweight any advantages achieved thereby. Hence, fluorine gas flow rates of between the range of 100–200 ml./min. have been found to be quite suitable for laboratory scale operations using a 3″ column (2.7″ I.D.). Similarly, helium flow rates within the same range have been quite suitable. It is preferred that the fluorine gas be introduced countercurrently to the flow of molten salt droplets and in the case of a vertical fluorinator column it is preferred that the fluorine gas be introduced at the bottom of the contactor.

After the fluorinator column is purged and brought up to temperature, the salt solvent is introduced into the column in dispersed droplet form, as for example by passing the molten salt through a spray nozzle. It will be apparent that other conventional methods may be employed to effect dispersion of the molten salt into the column. For example, the fused salt may be crushed to a partciular particle size and dropped through a preheater section disposed adjacent to and integral with the fluorinator section to convert the solid salt to a molten state immediately prior to entering the fluorinator section. Another embodiment may consist of heating the fused salt to a molten state and thereafter passing the molten salt through a seive plate which has openings that have been designed to provide a certain droplet size. Where, as for example, a spray nozzle is employed care must be taken to insure that the salt droplets do not come in contact with the column walls. Hence, it may be seen that the droplet size should be as large as possible to preclude contact with the column walls, as would occur if the droplets were on the order of a fine mist. In this respect molten salt droplets of less than 50 microns have been found to have a high rate of incidence with the contactor walls and accordingly are not preferred. Particles within the range of from 100–200 microns have little or no lateral movement during descent and in the case of a six foot contactor have freefall times of between 1.5–3.0 seconds. It will be apparent that the particle size, column diameter and height, fluorination temperatures, and freefall time may be varied to effect a particular result. In this respect, it may be seen that particles above 200 microns might be utilized but would require a longer column and/or a higher fluorination temperature (to insure that essentially all of the uranium was volatilized during descent). Moreover, it has been found that better than 99.9% uranium may be recovered from molten salt droplets of a particle size of about 200 microns and a fluorination temperature of about 700° C. Inasmuch as a practical upper fluorination temperature has been found to be about 700° C., it is, accordingly, preferred that the molten salt particles be within the range of from 100–200 microns. Furthermore, it may be seen that it is generally desirable to keep the time of fall of the particles through the fluorinator section as short as possible consistent with complete reaction. To illustrate, whereas particles less than 50 microns require 15 seconds to traverse a six foot column, particles within the range of 100–200 microns require only between 1.5 and 3.0 seconds to fall the same distance. As an additional precaution the spray nozzle should be designed to insure essentially no impingement of the molten salt droplets upon the contactor wall, and thereby greatly reduce the corrosion of the contactor.

The particular design of the fluorinator column is not critical. It will, however, be recognized that the column should be of sufficient length to provide, for a selected particle size range, maximum conversion of the fuel values. On a laboratory scale column heights of 2–6 feet have been found to be quite suitable. In this respect, it should be noted that as the particle size of the salt solvent increases the column height will likewise increase. As a special point, where a preheater section is employed, a height of about 26" and a temperature of about 650° C. have been found to be quite sufficient to convert the fused salt droplets (100–200 microns) to a molten state prior to ingress into the fluorinator section.

Any conventional heating means may be employed to maintain the fluorinator column at a temperature above the liquidus point of the particular salt solvent employed. It will be appreciated, however, that, where countercurrent flow is used and a chilled collection pool is employed, special attention must be directed to providing suitable heating means to partially offset those end effects, i.e., the cool end acting as a heat sink and gas streams entering both ends of the column. In any respect, it is important that whatever heating means is selected it be capable of maintaining a constant temperature within the fluorinator column during operation.

After the molten salt droplets have passed through the fluorinator section they are allowed to solidify and are collected in the bottom of the column. $UF_6$ will sorb on the solidified salt droplets, and it has been found that, in order to achieve high uranium recovery, the fluorinated salt droplets must be protected from $UF_6$ sorption. Applicants have found that this may conveniently be achieved by providing a chilled (0° C. or less) pool of a fluorocarbon compound, such as perfluoro-1,3-dimethylcyclohexane ($C_8F_{16}$), for the droplets to fall into. Other methods may equally be suitable such as providing an inert gas blanket or as mentioned hereinbefore providing a sufficient countercurrent flow of fluorine gas to sweep the volatilized $UF_6$ out of the fluorinator and hence preclude any $UF_6$ from contacting the solidified salt droplets.

While the present invention has generally been directed to fluorination of uranium values from molten fluoride salts, it will be appreciated by those skilled in the art that it is equally applicable to other reactor fuels such as plutonium. As shown in the basic fluoride volatility process of sparging reactor fuels such as plutonium from molten fluoride pools, an equilibrium condition exists wherein large amounts of fluorine are necessary to drive the equilibrium toward $PuF_6$. Inasmuch as in the present process the ratio of fluorine volume to salt volume is very high, it may readily be seen that applicants' process may afford a highly efficient, non-corrosive method for recovering plutonium values from molten fluoride salts. Of significance is the fact that, where both uranium and plutonium values are present in a given salt, the uranium is almost completely volatilized before the plutonium starts to be removed; hence, applicants' process might ideally be employed to not only volatilize valuable reactor fuel values from molten fluoride salts but also may provide other beneficial results in providing a convenient manner in which such fuels may be separated from each other.

Further illustration of the quantitative aspects and procedures of the present invention is provided in the following examples. Examples I–VII describe the basic procedure and technique used in carrying out a falling drop fluorination of $NaF-ZrF_4-UF_4$ salt mixture utilizing 28", 44" and 56" fluorinator columns, and Example VIII demonstrates the applicability of the present invention to a quaternary salt $NaF-ZrF_4-LiF-UF_4$.

EXAMPLE I

A ternary alkali salt mixture having a composition of 48.75–48.75–2.5 $NaF-ZrF_4-UF_4$ (mole percent) was ground and sieved into various particle size ranges. The original uranium concentration of the fused salt was determined by fluorometric analysis and the liquidus temperature of the salt mixture was 510° C. A vertical, nickel fluorinator column (2.7" I.D.), consisting of a 42" preheater section and a 28" fluorination section was fitted with a powder feeder at the top end and a collecting container at the bottom end and provided with five electrically heated resistance furnaces with separate variac controls. A helium gas source was connected to the top of the column and a fluorine gas source to the bottom. Preliminary to the actual fluorination, the entire column was flushed with helium for one hour and then the fluorination section was flushed with fluorine with an equal amount of helium flowing through the preheater section. The flow rates of the fluorine and helium gases were 200 mls./min. respectively.

After the column was flushed with the process gases, it was brought up to operating temperatures and runs were made at 570° C. and 647° C. A five-gram sample of the respective particle size ranges was placed in the powder feeder and fed into first the preheater section, which was maintained at a temperature of about 650° C., to convert the fused salt mixture into molten droplets. Then the molten droplets passed through the fluorination section of the column converting the $UF_4$ to $UF_6$ with the volatile $UF_6$ product being carried out of the column by the fluorine gas stream. After passing through the fluorination section the solidified salt droplets were collected in the bottom of the column in a stainless steel collection cup containing liquid perfluoro-1,3-dimethylcyclohexane ($C_8F_{16}$) which was maintained at about 0° C. The solidified molten salt droplets were subsequently analyzed for uranium concentration by fluorometric analysis. The results are shown in Table I below.

Table I.—Falling drop fluorination

| Run | Temperature, ° C. | Size range, microns | Initial U conc., p.p.m. | Final U conc., p.p.m. | Percent U recovered |
|---|---|---|---|---|---|
| 1 | 570 | >149 | 46,800 | 5,730 | 87.8 |
| 2 | 570 | 125–149 | 46,800 | 3,020 | 93.6 |
| 3 | 570 | 105–125 | 46,800 | 490 | 98.96 |
| 4 | 570 | 88–105 | 46,800 | 220 | 99.5 |
| 5 | 570 | 63–88 | 46,800 | 230 | 99.5 |
| 6 | 647 | >177 | 38,200 | 429 | 98.9 |
| 7 | 647 | 149–177 | 38,200 | 183 | 99.5 |
| 8 | 647 | 125–149 | 38,200 | 73 | 99.8 |
| 9 | 647 | 105–125 | 38,200 | 64 | 99.8 |

EXAMPLE II

A falling drop fluorination of the ternary alkali salt mixture 45.5–45.5–9 NaF–ZrF$_4$–UF$_4$ (mole percent) was carried out in the apparatus employed in Example I and the same analytical technique was used to determine the percent uranium recovery. The fluorination temperatures were 574° C. and 660° C., respectively, and the liquidus temperature of the salt mixture was 550° C. The results are shown in Table II below.

*Table II*

| Run | Temperature, °C. | Size range, microns | Initial U conc., p.p.m. | Final U conc., p.p.m. | Percent U recovered |
|---|---|---|---|---|---|
| 1 | 574 | >177 | 210,000 | 10,700 | 94.9 |
| 2 | 574 | 149–177 | 210,000 | 7,800 | 96.3 |
| 3 | 574 | 125–149 | 210,000 | 8,300 | 96.0 |
| 4 | 574 | 105–125 | 210,000 | 2,100 | 99.0 |
| 5 | 574 | 88–105 | 210,000 | 800 | 99.6 |
| 6 | 574 | <88 | 210,000 | 700 | 99.7 |
| 7 | 660 | 177–210 | 194,000 | 997 | 99.5 |
| 8 | 660 | 149–177 | 194,000 | 588 | 99.7 |
| 9 | 660 | 125–149 | 194,000 | 379 | 99.8 |
| 10 | 660 | 105–125 | 194,000 | 243 | 99.9 |
| 11 | 660 | <105 | 194,000 | 206 | 99.9 |

EXAMPLE III

A falling drop fluorination of the ternary alkali salt mixture 48.75–48.75–2.5 NaF–ZrF$_4$–UF$_4$ (mole percent) was carried out using a 26″ preheater section and a 44″ fluorination section in the same manner as employed in Example I. The fluorination temperatures were 559° C. and 638° C., respectively. The results are shown in Table III below.

*Table III*

| Run | Temperature, °C. | Size range, microns | Initial U conc., p.p.m. | Final U conc., p.p.m. | Percent U recovered |
|---|---|---|---|---|---|
| 1 | 559 | 125–149 | 54,400 | 1,724 | 97.0 |
| 2 | 559 | 105–125 | 54,000 | 419 | 99.4 |
| 3 | 559 | 88–105 | 54,000 | 212 | 99.5 |
| 4 | 559 | 63–88 | 54,000 | 202 | 99.6 |
| 5 | 638 | 177–210 | 51,600 | 260 | 99.2 |
| 6 | 638 | 149–177 | 51,600 | 126 | 99.5 |
| 7 | 638 | 125–149 | 51,600 | 75 | 99.7 |

EXAMPLE IV

A falling drop fluorination of the ternary alkali salt mixture 48–48–4 NaF–ZrF$_4$–UF$_4$ (mole percent) was carried out in the same manner as and in the same apparatus employed in Example III. The liquidus temperature of the salt mixture was 515° C. The results are shown in Table IV below.

*Table IV*

| Run | Temperature, °C. | Size range, microns | Initial U conc., p.p.m. | Final U conc., p.p.m. | Percent U recovered |
|---|---|---|---|---|---|
| 1 | 556 | >149 | 83,900 | 590 | 99.3 |
| 2 | 556 | 125–149 | 83,900 | 2,190 | 97.4 |
| 3 | 556 | 105–125 | 83,900 | 590 | 99.3 |
| 4 | 556 | 88–105 | 83,900 | 290 | 99.7 |
| 5 | 556 | 63–88 | 83,900 | 190 | 99.8 |
| 6 | 560 | 177–210 | 84,000 | 4,500 | 94.6 |
| 7 | 560 | 149–177 | 84,000 | 6,980 | 91.7 |
| 8 | 560 | 125–149 | 84,000 | 1,650 | 98.0 |
| 9 | 636 | 125–149 | 84,800 | 414 | 99.94 |
| 10 | 636 | 105–125 | 84,800 | 179 | 99.99 |
| 11 | 636 | 88–105 | 84,800 | 9.7 | 99.99 |
| 12 | 636 | 63–88 | 84,800 | 10.3 | 99.99 |
| 13 | 636 | >177 | 87,100 | 49 | 99.5 |
| 14 | 636 | 149–177 | 87,100 | 3 | 99.8 |
| 15 | 636 | 125–149 | 87,100 | 3 | 99.99 |
| 16 | 636 | 105–125 | 87,100 | 1 | 99.99 |

EXAMPLE V

A falling drop fluorination of the ternary alkali salt mixture 45.5–45.5–9 NaF–ZrF$_4$–UF$_4$ (mole percent) was carried out in the same manner as and in the same apparatus employed in Example III. The results are shown in Table V below.

*Table V*

| Run | Temperature, °C. | Size range, microns | Initial U conc., p.p.m. | Final U conc., p.p.m. | Percent U recovered |
|---|---|---|---|---|---|
| 1 | 556 | 149–177 | 170,000 | 21,900 | 87.1 |
| 2 | 556 | 125–149 | 170,000 | 9,700 | 94.3 |
| 3 | 556 | 105–125 | 170,000 | 2,700 | 98.4 |
| 4 | 556 | 88–105 | 170,000 | 1,700 | 99.0 |
| 5 | 556 | <88 | 170,000 | 1,800 | 98.9 |
| 6 | 640 | 149–177 | 186,000 | 162 | 99.91 |
| 7 | 640 | 125–149 | 186,000 | 65 | 99.97 |
| 8 | 640 | 105–125 | 186,000 | 70 | 99.96 |

EXAMPLE VI

A falling drop fluorination of the ternary alkali salt mixture 48–48–4 NaF–ZrF$_4$–UF$_4$ (mole percent) was carried out in the same manner as employed in Example I, using a 14″ preheater section and a 56″ fluorination section. The fluorination temperatures were 572° C. and 622° C., respectively. The results are shown in Table VI below.

*Table VI*

| Run | Temperature, °C. | Size range, microns | Initial U conc., p.p.m. | Final U conc., p.p.m. | Percent U recovered |
|---|---|---|---|---|---|
| 1 | 572 | >210 | 83,700 | 3,740 | 95.5 |
| 2 | 572 | 177–210 | 83,700 | 2,160 | 97.4 |
| 3 | 572 | 149–177 | 83,700 | 680 | 99.2 |
| 4 | 572 | 125–149 | 83,700 | 220 | 99.7 |
| 5 | 622 | >149 | 77,100 | 1,770 | 99.7 |
| 6 | 622 | 125–149 | 77,100 | 229 | 99.7 |
| 7 | 622 | 105–125 | 77,100 | 82 | 99.9 |
| 8 | 622 | 88–105 | 77,100 | 87 | 99.9 |
| 9 | 622 | 63–88 | 77,100 | 54 | 99.9 |
| 10 | 622 | 53–63 | 77,100 | 341 | 99.6 |

EXAMPLE VII

A falling drop fluorination of the ternary alkali salt mixture 48–48–4 NaF–ZrF$_4$–UF$_4$ (mole percent) was carried out in the same manner as in Example VI. with the exception that the solidified droplets were not collected in a liquid fluorocarbon pool but rather were exposed to the process gases. The results are shown in Table VII below and in comparison with the results shown in Example VI demonstrate the necessity to protect the fluorinated salt droplets from UF$_6$ sorption.

*Table VII*

| Run | Temperature, °C. | Size range, microns | Initial U conc., p.p.m. | Final U conc., p.p.m. | Percent U recovered |
|---|---|---|---|---|---|
| 1 | 560 | >177 | 87,500 | 6,240 | 92.9 |
| 2 | 560 | 149–177 | 87,500 | 4,110 | 95.3 |
| 3 | 560 | 125–149 | 87,500 | 1,590 | 98.2 |
| 4 | 560 | 105–125 | 87,500 | 820 | 99.1 |
| 5 | 560 | 88–105 | 87,500 | 820 | 99.1 |

EXAMPLE VIII

A falling drop fluorination of a quaternary alkali salt mixture 31.66–31.66–31.66–5 NaF–ZrF$_4$–LiF$_4$–UF$_4$ (mole percent) was carried out using a 42″ preheater section and a 28″ fluorination section in the same manner as employed in Example I. The liquidus temperature of the salt mixture was 460° C. The results are shown in Table VIII below.

*Table VIII*

| Run | Temperature, °C. | Size range, microns | Initial U conc., p.p.m. | Final U conc., p.p.m. | Percent U recovered |
|---|---|---|---|---|---|
| 1 | 563 | >149 | 124,000 | 4,800 | 96.1 |
| 2 | 563 | 125–149 | 124,000 | 366 | 99.7 |
| 3 | 563 | 105–125 | 124,000 | 122 | 99.9 |
| 4 | 563 | 88–105 | 124,000 | 52 | 99.96 |
| 5 | 563 | 63–88 | 124,000 | 37 | 99.97 |

It will be understood that while the present invention has been described herein by certain specific embodiments, it is not intended thereby to have the invention limited to the details given, inasmuch as many apparently widely different embodiments of this invention may be made without departing from the spirit and scope thereof.

What is claimed is:

1. In a method for the removal of neutron-irradiated reactor fuels from a fused salt mixture wherein said salt mixture is heated to a molten state, dispersed into salt droplets and contacted with fluorine gas to convert said fuel values to the volatile hexafluoride state and thereby volatilize same, the improvement comprising the steps of contacting said salt droplets with gaseous fluorine at a temperature at least as great as the liquidus temperature of said salt mixture to thereby convert said fuel values to the volatile hexafluoride state, and thereafter recovering said volatilized hexafluoride product.

2. The method of claim 1 wherein said neutron-irradiated reactor fuels consist of uranium and plutonium values.

3. An improved method for recovering uranium values from an alkali metal fluoride salt mixture containing same wherein said salt mixture is heated to a molten state, dispersed into salt droplets and contacted with fluorine gas to convert said fuel values to the volatile hexafluoride state and thereby volatilize same, comprising the steps of contacting said salt droplets with gaseous fluorine at a temperature at least as great as the liquidus temperature of said salt mixture to thereby convert said uranium $UF_6$ and thereafter recovering said $UF_6$.

4. The method of claim 3 wherein said alkali metal fluoride salt mixtures are selected from the group consisting of $NaF-LiF$, $LiF-BeF_2$, $NaF-ZrF_4$, $NaF-LiF-ZrF_4$, $KF-ZrF_4$ and $Li^7F-BeF_2-ZrF_4$.

5. The method of claim 3 wherein said alkali metal fluoride salt mixture is 48.75–48.75–2.5 $NaF-ZrF_4-UF_4$ (mole percent) and said temperature at which said salt droplets are contacted by said gaseous fluorine is within the range of 510–700° C.

6. An improved method for recovering uranium and plutonium values from a fused salt mixture containing same wherein said salt mixture is heated to a molten state, dispersed into salt droplets, an contacted with fluorine gas to convert said uranium and plutonium values to the volatile hexafluoride state and thereby volatilize same comprising the steps of countercurrently contacting said droplets with gaseous fluorine at a temperature at least as great as the liquidus temperature of said salt mixture to thereby convert said fuel values to the volatile hexafluoride state and thereafter recovering said volatilized hexafluoride product.

7. The method of claim 6 wherein said fused salt mixture is an alkali fluoride salt mixture.

8. The method of claim 7 wherein said alkali fused salt mixture is selected from the group consisting of $NaF-LiF$, $LiF-BeF_2$, $NaF-ZrF_4$, $KF-ZrF_4$, $$NaF-LiF-ZrF_4$$

and $Li^7F-BeF_2-ZrF_4$.

9. The method of claim 6 wherein said fused mixture is 48.75–48.75–2.5 $NaF-ZrF_4-UF_4$ (mole percent) and said temperature at which said salt droplets are contacted by said gaseous fluorine is within the range of 510°–700° C.

10. An improved method for recovering uranium values from a 48.75–48.75–2.5 $NaF-ZrF_4-UF_4$ (mole percent) salt mixture containing same wherein said salt mixture is heated to a molten state, dispersed into salt droplets and contacted with fluorine gas to convert said fuel values to the volatile hexafluoride state and thereby volatilize same comprising the steps of countercurrently contacting said salt droplets with gaseous fluorine at a temperature within the range of 510°–700° C. to thereby convert said uranium to $UF_6$, thereafter causing said salt droplets to solidify and collecting said solidified salt droplets to preclude said volatilized $UF_6$ from sorbing on said solidified salt droplets.

11. The method of claim 10 wherein said salt droplets are within the particle size range of 100–200 microns.

References Cited by the Examiner

UNITED STATES PATENTS 3,031,261    4/1962    Vogel et al.          23—14.5

References Cited by the Applicant

Report No. ANL–6131, "Spray Fluorination of Fused Salt as a Uranium Recovery Process, issued March 1960.

BENJAMIN R. PADGETT, *Primary Examiner.*

S. TRAUB, *Assistant Examiner.*